March 23, 1926.
A. W. NORDGREN
1,578,086
FENDER GUARD STRUCTURE
Filed Jan. 7, 1926
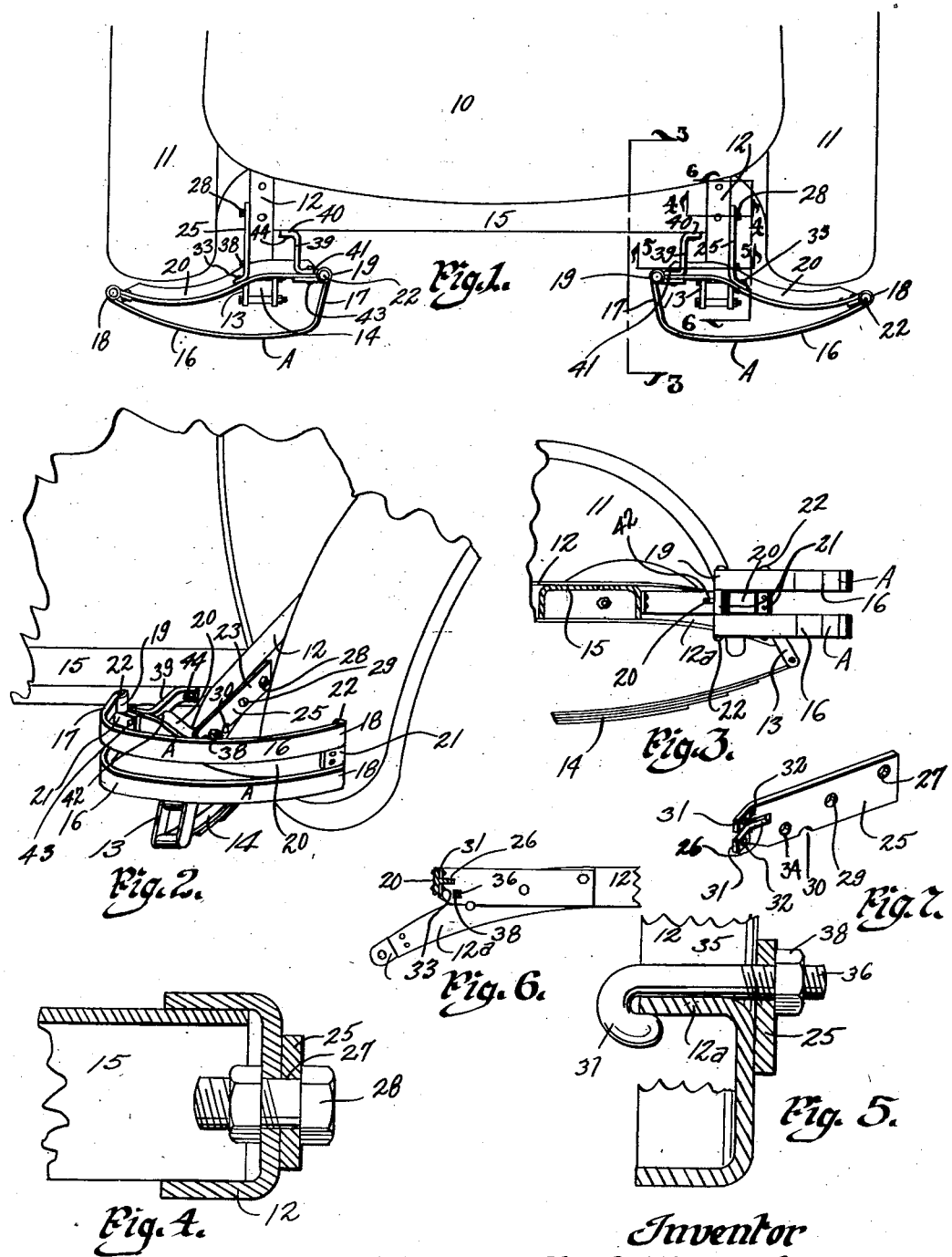
Witness
David Bair
Inventor
Algot W. Nordgren
by Bair & Freeman Attorneys Patented Mar. 23, 1926.

1,578,086

UNITED STATES PATENT OFFICE.

ALGOT W. NORDGREN, OF ST. PAUL, MINNESOTA, ASSIGNOR TO MARQUETTE MANUFACTURING COMPANY, OF ST. PAUL, MINNESOTA.

FENDER-GUARD STRUCTURE.

Application filed January 7, 1926. Serial No. 79,780.

*To all whom it may concern:*

Be it known that I, ALGOT W. NORDGREN, a citizen of the United States, and a resident of St. Paul, in the county of Ramsey and State of Minnesota, have invented a certain new and useful Fender-Guard Structure, of which the following is a specification.

The object of my invention is to provide a fender guard structure of simple, durable and inexpensive construction.

More particularly, it is my object to provide a fender guard of simple structure with a novel supporting means, whereby the device is peculiarly adapted for mounting on the well-known Chevrolet automobile.

With these and other objects in view, my invention consists in the construction, arrangement and combination of the various parts of my fender guard structure, whereby the objects contemplated are attained, as hereinafter more fully set forth, pointed out in my claims, and illustrated in the accompanying drawings, in which:

Figure 1 is a plan view of the rear part of an automobile having my fender guard structure installed thereon.

Figure 2 is a perspective view, illustrating the manner of mounting one of the fender guard structures on the car.

Figure 3 is a detail, sectional view of a portion of the car frame, illustrating the fender guard structure as viewed from the inside, taken on the line 3—3 of Figure 1.

Figure 4 is a detail, sectional view taken on the line 4—4 of Figure 1.

Figure 5 is a similar view taken on the line 5—5 of Figure 1.

Figure 6 is a detail, sectional view taken on the line 6—6 of Figure 1, parts of the fender guard structure being omitted; and Figure 7 is a perspective view of one of the supporting members.

In the accompanying drawings, I have used the reference numeral 10 to indicate generally the body of an automobile having the fenders 11, and the longitudinal frame members 12, having the form of an inwardly opening channel terminating in the formed or downwardly inclined portion 12ª at the rear end. The portion 12ª supports the spring shackle 13 for the spring 14.

The longitudinal frame members 12 are connected near the rear of the car by a downwardly opening channel-shaped frame member 15.

My improved bumper structure comprises a pair of vertically spaced, spring bumper members A. Each of the spring bumper members A comprises a curved portion 16 adapted to stand in position to guard one end of a fender 11, and a portion 17 inclined toward the body of the car at the inner end of the portion 16.

The spring bumper members A are provided at their outer ends with eyes 18 and at their inner ends with eyes 19.

A rigid curved connecting member 20, preferably of T-iron, has eyes 21 at its ends received between the eyes 19 and the eyes 18 respectively.

Bolts 22 are extended through the eyes 18 and 21 and through the eyes 19 and 21 for holding the spring bumper members and the rigid connecting member in proper assembled relation.

The member 20 is arranged with its horizontal middle flange extending away from the spring bumper members A.

For supporting the bumper structure just described, on the car, I have provided the following means:

A relatively heavy bar 25 is connected with the connecting member 20 and has at its end fastened to the member 20 a longitudinal slot 26.

The member 25 is a supporting member and has near its end farthest from the bumper member 20 a hole 27 adapted to receive the bolt 28, by which the member 25 is fastened to the frame member 12.

The supporting member 25 has between its ends a hole 29 to receive the head of a rivet found on the Chevrolet automobile.

On the lower edge of the supporting member 25 is a notch 30 to receive another rivet.

The slot 26 receives the horizontal flange of the member 20 and the end of the supporting member 25 adjacent to the member 20 is bent as at 31 to form arms or portions standing respectively above and below the horizontal flange of the member 20 and provided with holes 32 to receive bolts or rivets 33, by which the member 25 is rigidly connected with the member 20.

Assuming the parts to be in the position for installation on the rear of the car, it will be noted that the member 25 has a hole 34 near its rear end at its lower portion.

A hook, comprising the shank 35, having the screw-threaded end 36, and a hook end 37, has the screw-threaded portion of its shank extended through the hole 34. The parts are so located that the shank 35 rests on the downward curved formed portion 12ª of the frame member 12, as illustrated in Figures 5 and 6.

The hook member 37 engages the inner edge of the upper, horizontal flange of the frame member 12, as shown in Figure 5, and a nut 38 is employed for rigidly connecting the member 25 to the form 12ª.

A supporting element 39 is provided, which comprises a bar having, when the parts are in the position assumed, a right-angled extension or portion 40 at its forward end and an oppositely extended right-angled portion or extension 41 at its rearward end.

The rearward part of the supporting element 39 has a slot 42, shown for instance in Figures 2 and 3, to receive the horizontal flange of the rigid connecting member 20.

The right-angled extension 41 is riveted or bolted to the member 20 as at 43.

The extension 40 is bolted to the transverse frame member 15 as at 44.

I have thus provided a fender guard structure having a very rigid and sturdy connection with the car frame.

The supporting means, however, are very simple and can be quickly, easily and readily installed upon the car without interfering with or being interfered with by the standard parts of the automobile.

I claim as my invention:

1. In a fender guard structure, a bumper member comprising a T-iron member, a supporting member having a slot receiving the horizontal flange of the T-iron member and curved portions above and below the slot rigidly connected to the T-iron member, said supporting member being adapted to be bolted to a longitudinal frame member of a car, a supporting element fixed to said T-iron member spaced from the point of connection between the bumper member and the supporting member and extending away therefrom and adapted to be fixed to a transverse frame member of a car.

2. In a fender guard structure, a bumper member comprising a T-iron member, a supporting member having a slot receiving the horizontal flange of the T-iron member and curved portions above and below the slot rigidly connected to the T-iron member, said supporting member being adapted to be bolted to a longitudinal frame member of a car, a supporting element fixed to said T-iron member spaced from the point of connection between the bumper member and the supporting member and extending away therefrom and adapted to be fixed to a transverse frame member of a car, said supporting element having at its ends substantially right-angled extensions.

3. In a fender guard structure, a bumper member comprising a T-iron member, a supporting member having a slot receiving the horizontal flange of the T-iron member and curved portions above and below the slot rigidly connected to the T-iron member, said supporting member being adapted to be bolted to a longitudinal frame member of a car, a supporting element fixed to said T-iron member spaced from the point of connection between the bumper member and the supporting member and extending away therefrom and adapted to be fixed to a transverse frame member of a car, said supporting element having at its ends substantially right-angled extensions, one end of said supporting element having a slot to receive an angle of the T-iron member.

4. In a device of the class described, a bumper member having a horizontal flange, a support having a slot for receiving said flange and portions above and below the slot secured to said bumper member, a supporting element secured to said bumper member spaced from the point of connection between the bumper member and the support and adapted to be secured to a car at a point spaced from said support.

5. In a device of the class described, a bumper member, a supporting member secured thereto between the ends of the bumper member, a car frame member having a downwardly inclined horn at one end and comprising a channel, means for fastening said supporting member to said channel-shaped frame member, and a brace element connected to the bumper and extending forwardly therefrom and fixed to the car frame at a point spaced from the supporting member.

6. In a device of the class described, a bumper member, a supporting member secured thereto, between the ends of the bumper member, a car frame member having a downwardly inclined horn at one end and comprising a channel, means for fastening said supporting member to said channel-shaped frame member, and a second fastening means extended through said supporting member and provided with a hook for engaging a flange of said channel member, a supporting element secured to said bumper member spaced from the point of connection between the bumper member and the supporting member, a transverse car frame member, and means for securing said supporting element with said transverse member.

7. The combination of a car frame including a longitudinal member having a downwardly inclined horn at one end, comprising a channel, and a transverse car frame member with a bumper structure having an element with a horizontal flange, a supporting member having a slot receiving said flange and having portions above and below the slot fixed to said bumper member, a bolt for securing said supporting member to the longitudinal car frame member, a hook device receiving one flange of the longitudinal car frame member and having a shank extended through said supporting member and resting above said horn, and a supporting element having a slot at one end for receiving the horizontal flange of said bumper member and having portions above and below said horizontal flange of the bumper member secured to the bumper member, said supporting element having at its opposite end a right-angled extension secured to the transverse car frame member.

ALGOT W. NORDGREN.